Jan. 1, 1957 B. G. ELLIOTT 2,775,991
FEED ROLL SUPPORTING MECHANISM
Filed Jan. 26, 1953 4 Sheets-Sheet 1

INVENTOR.
BRANTFORD G. ELLIOTT.
BY
ATTORNEYS.

Jan. 1, 1957 B. G. ELLIOTT 2,775,991
FEED ROLL SUPPORTING MECHANISM
Filed Jan. 26, 1953 4 Sheets-Sheet 2

INVENTOR.
BRANTFORD G. ELLIOTT.
BY
ATTORNEYS.

INVENTOR.
BRANTFORD G. ELLIOTT.
ATTORNEYS.

Jan. 1, 1957          B. G. ELLIOTT          2,775,991

FEED ROLL SUPPORTING MECHANISM

Filed Jan. 26, 1953          4 Sheets-Sheet 4

INVENTOR.
BRANTFORD G. ELLIOTT.
BY
ATTORNEYS.

2,775,991

FEED ROLL SUPPORTING MECHANISM

Brantford G. Elliott, Royal Oak, Mich., assignor to Harry Ferguson, Inc., Detroit, Mich., a corporation of Delaware Application January 26, 1953, Serial No. 333,192

2 Claims. (Cl. 146—118)

The invention relates to feed mechanisms for agricultural implements or machines for chopping or otherwise treating fibrous crop materials, and it is more particularly concerned with feed mechanisms of the type employing opposed, rotatably driven feed rolls one of which is supported for movement transaxially relative to the other to accommodate varying quantities of material.

One object of the invention is to provide an improved mounting for the movable roll of a feed mechanism of the above general character which eliminates the need for complicated and expensive guides and bearings, which utilizes roll supporting structure that is inexpensive to manufacture, and which is efficient and reliable in operation and in every respect eminently suitable for use in agricultural imprements and comparable machines subject to hard use and neglect.

Another object is to provide a feed roll mounting which effectively maintains the movable roll parallel to the opposed roll in all positions of adjustment without imposing excessive strains on the roll supporting bearings or other parts of the structure.

It is also an object of the invention to provide an improved chain drive for an assembly of fixed and adjustable feed rolls adapted to maintain constant driving engagement with all of the rolls while permitting the adjustable rolls to move freely for adjustment of roll spacing.

Other objects and advantages of the invention will become apparent from the following detailed description of the preferred embodiment in which.

For purposes of illustration the feed mechanism constituting the invention has been shown as incorporated in a tractor-drawn implement of the type adapted to cut hay or other fibrous forage crops into relatively short lengths. It is to be understood, however, that the showing is merely exemplary and that the invention may be used to advantage in other types of implements and machines either mobile or stationary and equipped with other types of crop treating mechanisms. It is also to be understood that various changes and modifications may be made in the form, construction and arrangement of the parts of the feed mechanism without departing from the spirit and scope of the invention as expressed in the appended claims.

Figure 2:
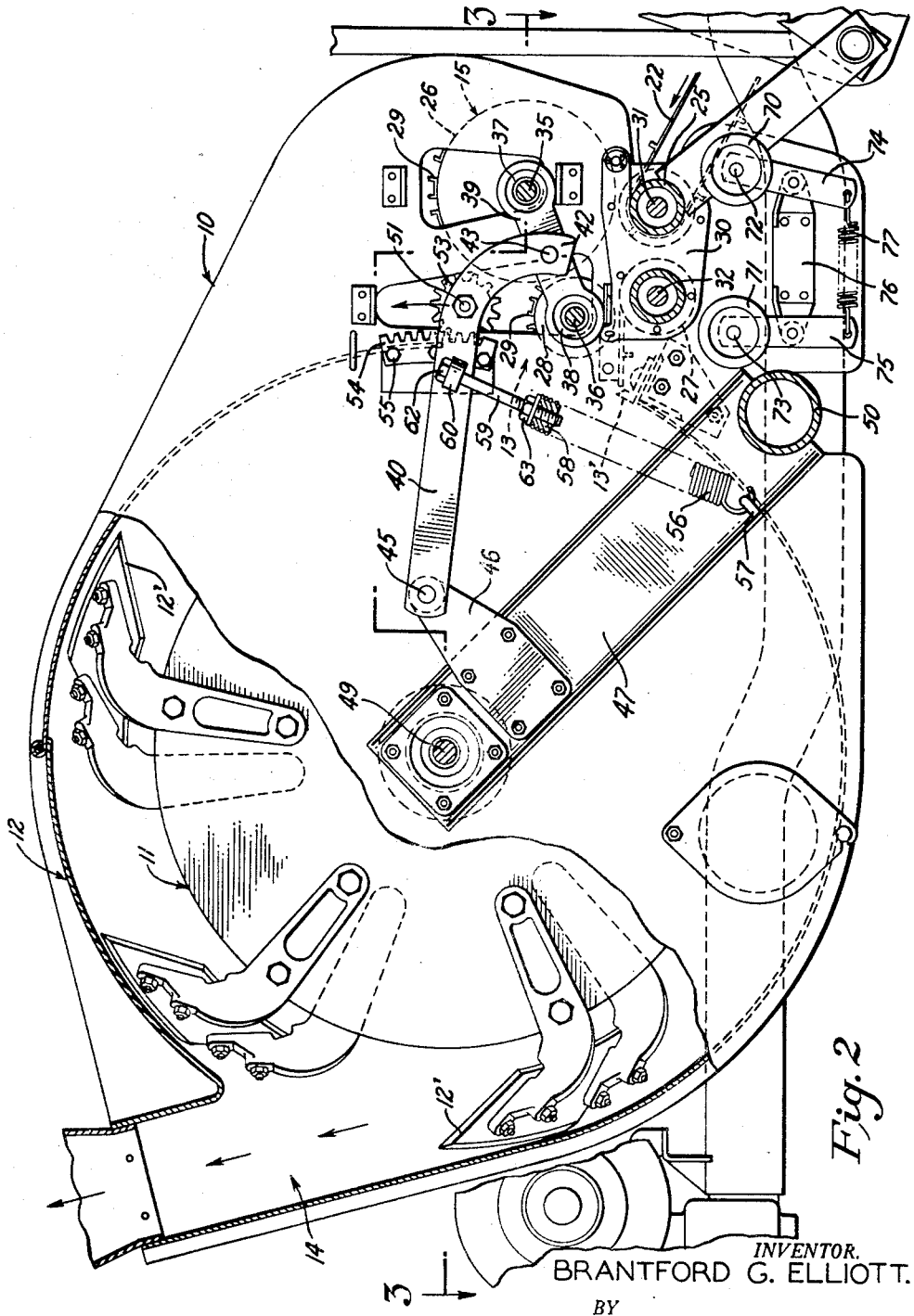
Fig. 2 is an enlarged fragmentary side view of the cutterhead of the forage harvester, its housing, and the mechanism for feeding fibrous crop material to the cutterhead.
Figure 3:
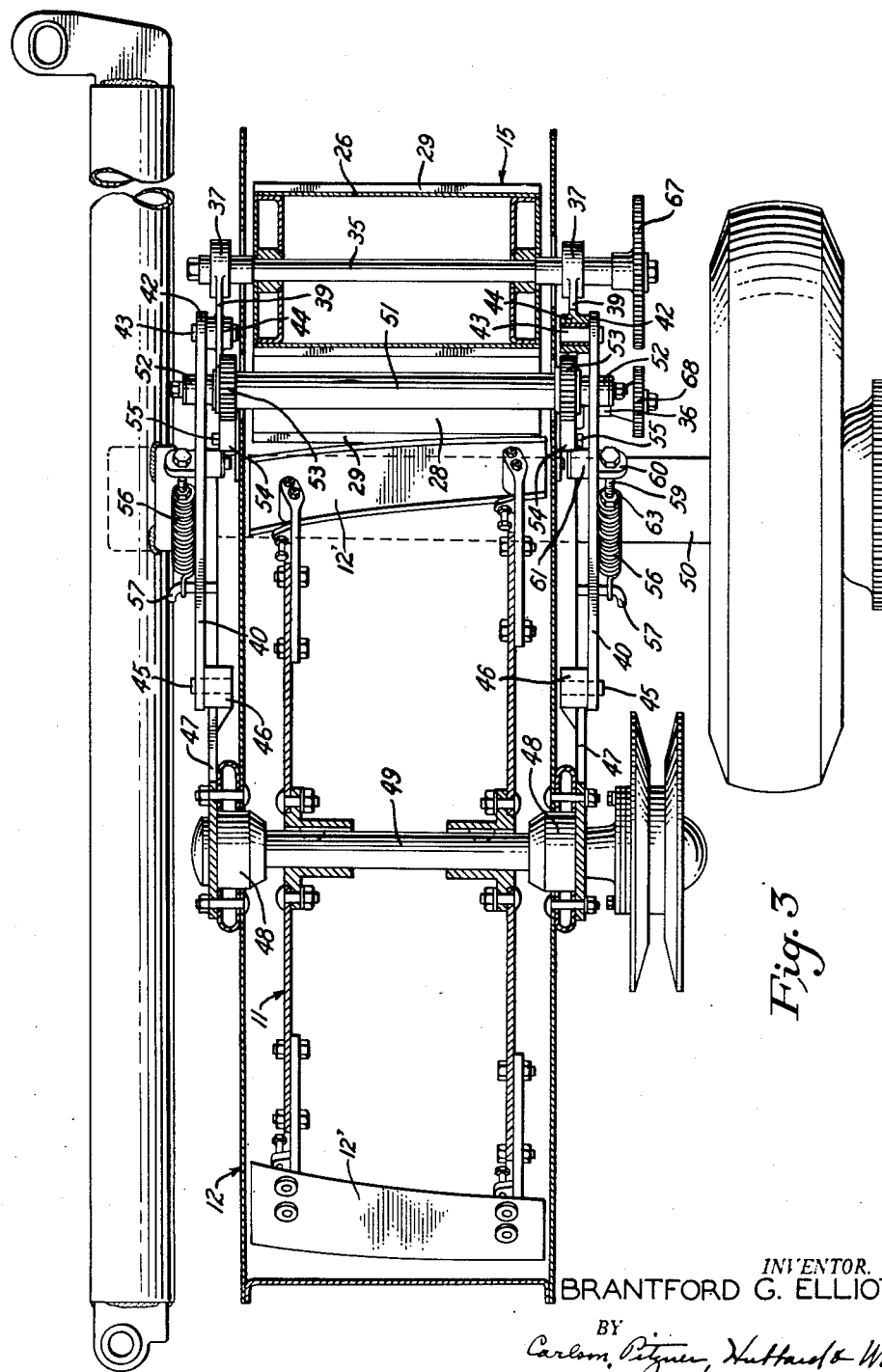
Fig. 3 is a sectional view of the cutterhead housing and associated equipment taken in offset planes substantially on the line 3—3 of Fig. 2.
Figure 4:
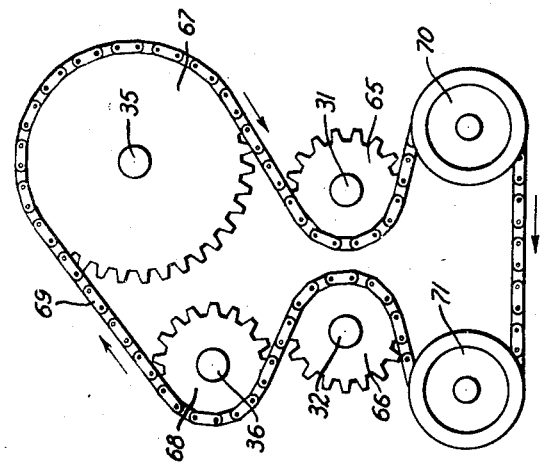
Fig. 4 is a fragmentary end view of the feed roll assembly showing the continuous chain drive for the rolls.

Referring to the drawings, the improved feed mechanism has been shown as embodied in a mobile implement 10 for treating forage crops such as hay and comparable fibrous material, the treatment in this instance constituting the chopping of the material into relatively short lengths. This treatment or chopping is effected by means of a cutter organization herein shown as similar to that disclosed and claimed in the copending application of Herman G. Klemm and Brantford G. Elliott, Serial No. 309,108, filed September 11, 1952, now Patent No. 2,747,634. Briefly, the cutter organization as shown in Figs. 2 and 3 comprises a rotatably driven cutterhead 11 enclosed within a generally cylindrical housing 12 having an inlet opening 13 at one side for the crop material which is severed by a series of knives 12' on the rotating head cooperating with a stationary cutter bar 13' mounted on the housing adjacent the lower edge of the inlet opening. The severed material is ejected through an outlet opening 14 at the other side of the housing. Feed mechanism 15 located adjacent the inlet opening 13 delivers the material to the cutterhead as described hereinafter.

Figure 1:
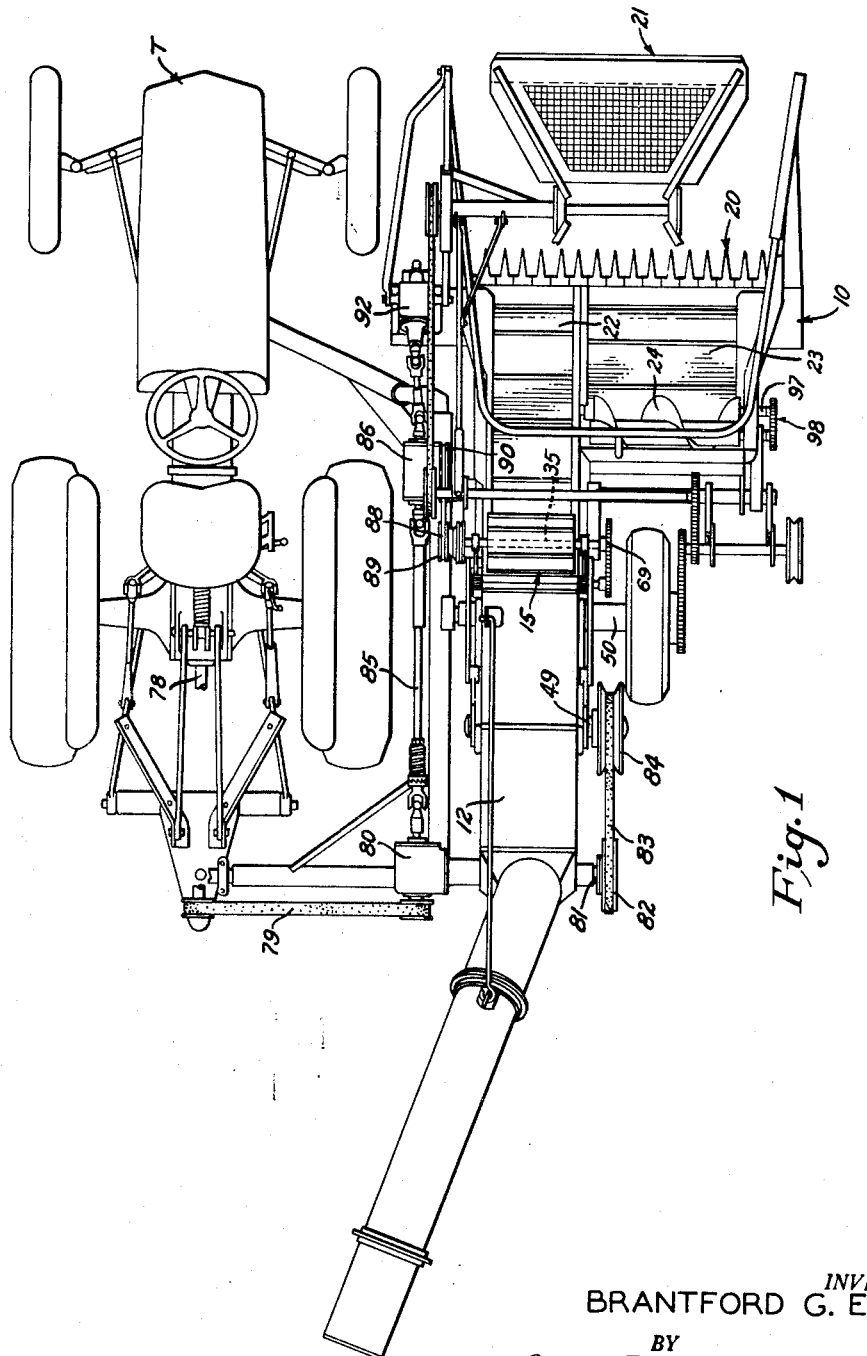
Fig. 1 is a plan view of a tractor-drawn forage harvester equipped with feed mechanism embodying the features of the invention.
Figure 5:
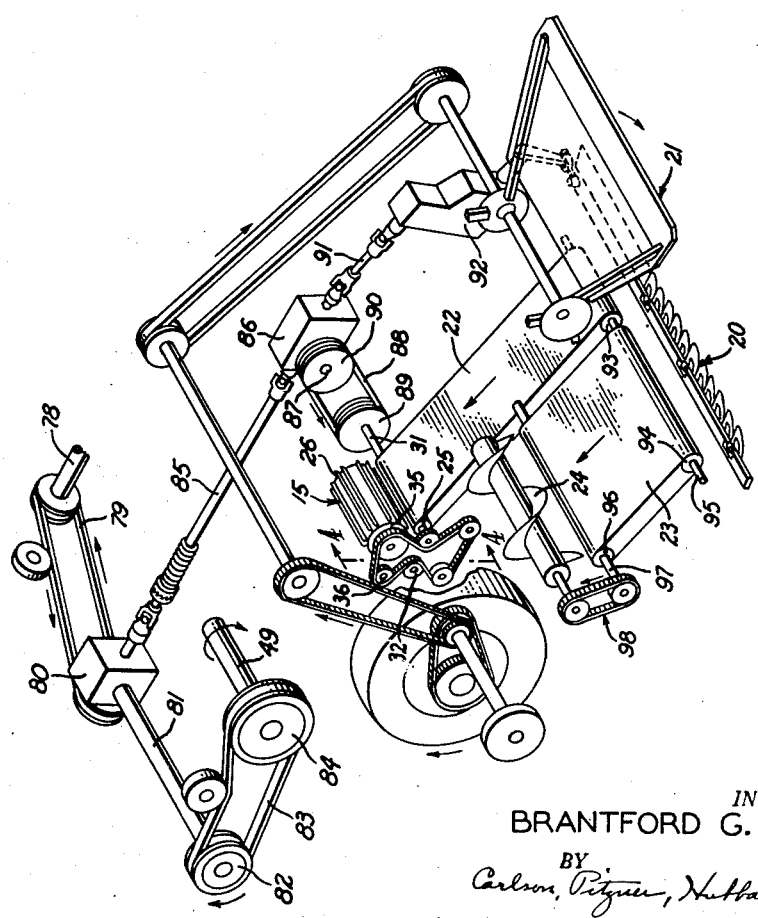
Fig. 5 is a diagrammatic view showing the drive for the feed mechanism and the other elements of the implement.

The exemplary implement is designed for handling crops in the field and to this end is adapted to be coupled in side-by-side relation to a tractor T which partially supports the implement and supplies the motive power for its operation. It will be understood that the implement may be provided with any preferred mechanism for picking up the crop material to be treated. The exemplary implement as shown in Figs. 1 and 5 is equipped for handling standing crops and to this end is equipped with a conventional reciprocating cutter bar 20. The material severed by the cutter bar 20 is transferred by a conventional reel or paddle wheel 21 to gathering mechanism which conveys it to the cutterhead 11 by way of the feed mechanism 15. The particular gathering mechanism shown is similar to that disclosed and claimed in my copending application Serial No. 333,191, filed January 26, 1953, now Patent No. 2,745,237. It consists generally of an elongated narrow belt or apron 22 extending from the rear of the cutter bar 20 to the feed mechanism. A substantially wider belt 23 located at one side of the belt 22 and extending across the remaining portion of the cutter bar carries the material cut by that portion of the cutter bar rearwardly to a screw conveyor 24 which moves the material transversely onto the belt 22. Thus all of the material picked up is ultimately carried by the belt 22 to the feed mechanism 15 which acts to feed such material to the cutterhead.

Referring to Figs. 2–3 and 5 of the drawings, the feed mechanism 15 in its preferred form comprises two pairs of opposed feed rolls 25, 26 and 27, 28 arranged in tandem relation. More particularly, the forward pair of rolls 25 and 26 is located at the discharge end of the conveyor belt 22 to receive the crop material therefrom and pass it along to the rearward pair of rolls 27 and 28. The latter rolls discharge the material into the cutter housing 12 across the stationary cutter bar 13'.

In the exemplary embodiment, the rolls 25 and 27 from a first pair of rolls which are located below the companion rolls 26 and 28 forming a second pair of rolls. The first pair of rolls are supported for rotation about parallel horizontally disposed axes. To guard against slippage of the material handled by the rolls the upper rolls 26 and 28 are preferably provided with gripping surfaces which may conveniently comprise longitudinally disposed ribs 29 projecting from the peripheral walls of the rolls. The roll 25 in this instance is a smooth roll and serves as a driving pulley for the conveyor belt 22 which is looped over the roll as shown in Figs. 2–5.

Support for the rolls 25 and 27 is provided by suitable bearings carried by supporting plates 30 rigidly attached to the implement frame at opposite sides of the conveyor belt 22. Those bearing journal shafts 31 and 32 to which the respective rolls 25 and 27 are keyed or otherwise nonrotatably fixed.

In the operation of crop treating implements of the type under consideration, the quantity of crop material delivered to the feed mechanism by the conveyor belt 22 may vary considerably due to different crop conditions and other factors. The stream of material of course is substantially limited to the width of the conveyor belt 22 and, consequently, the variations in quantity are reflected by corresponding changes in the thickness of the mass of material delivered to the feed rolls. To enable the rolls to accommodate such changes, the upper rolls 26 and 28 are supported for limited movement relative to the companion rolls transversely of the roll axis, that is, in a direction to increase or decrease the effective spacing of the opposed rolls.

The supporting structure for the movable rolls 26 and 28 which constitutes an important part of the present invention is characterized by its sturdiness and simplicity and, particularly, by the utilization of simple inexpensive bearings for journaling the roll shafts. Furthermore, the supporting structure positively maintains the movable rolls in parallel relation to their companion rolls without imposing excessive strains on the bearing, the supporting structure or any part of the implement frame.

As shown in Fig. 2 the feed rolls 26 and 28 are respectively keyed or otherwise non-rotatably fixed to shafts 35 and 36. These shafts are journaled at opposite ends in bearings 37 and 38 carried at opposite ends of rigid links 39. These links, in turn, are pivotally supported intermediate their ends adjacent the free ends of a pair of rigid arms 40 which, in turn, are pivoted adjacent their opposite ends on the implement frame to swing about a common horizontal axis. Preferably, the outer or free ends of the arms 40 terminate in downwardly turned tip portion 42 to afford clearance for other mechanism to be described hereinafter. Each tip portion 42 carries an inwardly directed stud 43 engageable in a bearing 44 on the link 39 to pivotally support the link.

In the illustrative implement, the arms 40 are supported by pivot pins 45 on brackets 46 bolted or otherwise secured to rigid frame members 47 disposed at opposite sides of the housing 12. These frame members carry bearings 48 journaling a shaft 49 upon which the cutterhead 11 is mounted. The frame members 47, in this instance, extend upwardly and rearwardly from a tubular transverse frame member 50 to which they are welded or otherwise rigidly secured.

To prevent cocking of the adjustable rolls 26 and 28 due to unevenness in the mass of material passing between them and their companion rolls and thus permit the use of simple, inexpensive bearings for journaling the shafts 35 and 36 for those rolls, means is provided on the supporting arms 40 cooperating with means on the implement frame constraining them to swing about their pivots as a unit. For this purpose the arms are coupled together adjacent their free ends by a cross member in the forming of a shaft 51 journaled in bearings 52 rigid with the respective arms. Pinions 53 nonrotatably mounted on the shaft 51 closely adjacent the arms 40 are arranged to mesh with arcuate toothed racks 54 rigidly secured to the sides of the cutter housing 12 as by bolts 55 as shown in Figs. 2 and 3.

Through the cooperative action of the pinions and racks, the arms 40 are thus maintained in step in their pivoting movements without imposing any twisting strains on the supporting structure or the framework of the implement. As the arms 40 swing together as a unit, the bearings supporting the roll shafts 35 and 36 also move up and down in unison so that the roll shafts are maintained parallel to each other and to the shafts of the companion rolls at all times. In other words, no cocking of the roll shafts can occur and, accordingly, simple inexpensive bearings may be employed for journaling the shafts.

While any suitable means may be utilized for urging the movable rolls 26 and 28 toward their companion rolls 25 and 27 to enable them to grip the crop material effectively, it is preferred to employ for that purpose spring means acting on the arms 40. The spring means as shown in Figs. 2 and 3 comprises a coiled tension spring 56 for each arm. The spring is anchored at one end to the adjacent frame member 47 as by a hook element 57. At its other end the spring is connected with the arm 40 by an adjustable coupling device through the medium of which spring tension on the arm may be regulated.

Referring more particularly to Fig. 2 of the drawings the coupling device as herein shown comprises a coupling element or plug 58 having its peripheral surface grooved for threadedly engaging in the end of the spring 56. A tension bolt 59 threaded into the plug 58 projects axially of the spring and extends through an apertured lug 60 on the arm 40, the head 62 of the bolt engaging the upper face of the lug. Preferably, the lug 60 is pivotally mounted on the arm 40 by means of a boss 61 on the arm formed with a transversely disposed socket adapted to receive the shank portion of the lug 60. Adjustment of spring tension may be effected by screwing the rod 59 into or out of the plug 58, and such adjustment is maintained by a lock nut 63 threaded on the rod.

The invention also provides a novel chain drive for interconnecting the feed roll shafts which is particularly suitable for roll assemblies of the type having one or more rolls mounted for adjustment relative to their companion rolls. Provision is made for connecting the shaft of one roll of the assembly, in this instance, the shaft 31 of the roll 25, to a suitable source of power and the chain drive serves to transmit power from that shaft to the shafts of the other rolls. For this purpose the roll shafts 31, 32, 35 and 36, respectively, have sprocket wheels 65, 66, 67 and 68 mounted on and keyed or otherwise non-rotatably secured to their corresponding ends. An endless chain 69 is trained over the sprocket wheels, the chain passing over and engaging the outer sides of the upper sprocket wheels 67 and 68 and engaging the inner sides of the sprocket wheels 65 and 66. To maintain the chain in driving engagement with the lower sprocket wheels and to accommodate changes in the spacing of the rolls with which the sprocket wheels are associated, the lower end of the chain 69 is looped over a pair of laterally spaced idler wheels 70 and 71 yieldably supported for movement toward and from each other.

As shown in Fig. 2 the wheels 70 and 71 are respectively journaled on stud shafts 72 and 73 carried on the upper ends of rigid arms 74 and 75 which are pivotally mounted intermediate their ends on opposite sides of a bracket 76 rigidly secured to the implement frame. Resilient means herein shown as a coiled tension spring 77 connected between the lower ends of the arms 74 and 75 urges the arms in a direction to swing the idler wheels outwardly or away from one another.

With the above arrangement the idler wheels 70 and 71 are enabled to swing in and out to keep the chain 69 taut and in engagement with a substantial portion of the teeth on each of the sprocket wheels as the adjustable rolls 26 and 28 move up and down. The chain is thus maintained under substantially uniform tension for proper drive of the feed rolls without in any way interfering with the adjustment of the rolls.

In the particular implement illustrated, power for driving the roll shaft 31 as well as other driven elements of the implement is derived from the power takeoff shaft 78 of the tractor T to which the implement is coupled. As shown in Figs. 1 and 5 of the drawings the shaft 78 is connected by a belt and pulley drive 79 with a gearbox 80 on the implement. One shaft 81 extending laterally from this gearbox has a pulley 82 connected by a belt 83 with a pulley 84 keyed to the shaft 49 which carries the cutterhead 11.

Another shaft 85 extends forwardly from the gearbox 80 to a second gearbox 86. Power is transmitted from this second gearbox to the shaft 31 through the medium of a shaft 87 belt 88 and pulleys 89 and 90 keyed to the respective shafts. In this particular implement the cutter bar 20 is also driven from the gearbox 86 by way of a forwardly extending shaft 91 and a third gearbox 92.

As mentioned heretofore, the driven feed roll 25 serves as a driving pulley for the conveyor belt 22. Through the belt 22 it also drives the conveyor belt 23 and the feed screw 24. The drive for the conveyor belt 23 is effected through the medium of guide rolls 93 and 94 over which the two conveyor belts are trained. These guide rolls are keyed to a common shaft 95 extending transversely across the front of the implement adjacent the cutter bar 20. Belt 23 at its upper end runs over a guide roll 96 keyed to a shaft 97 having a chain and sprocket connection 98 with the screw conveyor 24.

Through the medium of the drive mechanism above described the various mechanisms of the implement concerned with supplying fibrous crop material or the like to the cutterhead 11 are coordinated in their operations. Insofar as crop conditions permit, a uniform supply of material is fed continuously to the cutterhead for treatment thereby. Variations in the quantity of material available are compensated for by automatic adjustment of the feed roll spacing. Such adjustment is accomplished without imposing undue strains on the roll supporting structure or other parts of the implement, and in a manner which permits the rolls to be journaled in simple inexpensive bearings. In general, it will be apparent that the roll supporting and driving mechanism provided by the invention is simple and sturdy in construction, inexpensive to manufacure, and efficient and reliable in operation.

I claim as my invention:

1. The combination with mechanism for treating fibrous crop material, of mechanism for feeding material to the treating mechanism comprising, first and second pairs of feed rolls, framework supporting the treating mechanism and the first pair of rolls, a pair of laterally spaced arms each pivoted at one end on said framework, a shaft journaled in each of said arms and having a pair of pinions fixed to opposite ends thereof, a pair of racks mounted on said framework for engagement with the respective pinions to constrain said arms to move in unison, means carried on the free ends of said arms rotatably supporting said second pair of rolls for movement toward and from the associated first pair of rolls, a sprocket wheel coaxial with and drivingly connected to each of said four rolls, a pair of idler sprocket wheels supported at the side of the first pair of rolls opposite to the second pair of rolls for movement toward and from each other, an endless chain drivingly engaging all of said sprocket wheels, said chain being directed around the outer sides of said idler sprocket wheels and the sprocket wheels associated with the second pair of rolls and around the inner sides of the sprocket wheels associated with the first pair of rolls, and means yieldably urging one of said idler sprocket wheels away from the other idler sprocket wheel to maintain said drive chain taut as said arms move in unison when said second pair of rolls are shifted toward and from said first pair of rolls.

2. The combination with mechanism for treating fibrous crop material, of mechanism for feeding material to said treating mechanism comprising, first and second pairs of feed rolls, stationary framework rotatably supporting said first pair of rolls, pivotally supported arms rotatably supporting said second pair of rolls for bodily movement toward and from the first pair of rolls, rack means supported on said frame, pinion means on said arms operatively engaged with said rack means for constraining said arms to move as a unit, a sprocket wheel coaxial with and drivingly connected to each of said rolls, a pair of idler sprocket wheels supported on said framework at the side of said first pair of rolls opposite said second pair of rolls, an endless chain drivingly engaging a substantial portion of the teeth on each one of all of said sprocket wheels, said chain being directed around the outer sides of said idler sprocket wheels and the sprocket wheels associated with said second pair of rolls and around the inner sides of the sprocket wheels associated with the first pair of rolls, the support for said idler sprocket wheels comprising a pair of rigid levers each supporting one of the idler sprocket wheels adjacent one of its ends, means pivotally supporting said levers intermediate their ends and in laterally spaced relation on said framework, and a spring connected between the other ends of said levers yieldably urging them in a direction to swing the idler sprocket wheels apart to tension said drive chain during movement of said arms and second pair of rolls relative to said first pair of rolls.

References Cited in the file of this patent

UNITED STATES PATENTS

| | | |
|---|---|---|
| 265,769 | Dillman | Oct. 10, 1882 |
| 624,023 | Heine | May 2, 1899 |
| 1,305,607 | Johnson | June 3, 1919 |
| 2,390,949 | Krause et al. | Dec. 11, 1945 |
| 2,402,849 | Sensenig | June 25, 1946 |
| 2,612,974 | Krause | Oct. 7, 1952 |
| 2,621,778 | Heinje | Dec. 16, 1952 |
| 2,651,162 | Whisler | Sept. 8, 1953 |